United States Patent
Shimaoka et al.

(10) Patent No.: US 7,872,219 B2
(45) Date of Patent: Jan. 18, 2011

(54) ILLUMINATION DEVICE WITH PLURAL COLOR LIGHT SOURCES AND FIRST AND SECOND INTEGRATORS

(75) Inventors: Yusaku Shimaoka, Osaka (JP); Atsushi Hatakeyama, Osaka (JP); Yoshimasa Fushimi, Osaka (JP); Hiroshi Miyai, Hyogo (JP)

(73) Assignee: Panasonic Corporation, Osaka (JP)

( * ) Notice: Subject to any disclaimer, the term of this patent is extended or adjusted under 35 U.S.C. 154(b) by 280 days.

(21) Appl. No.: 12/161,109

(22) PCT Filed: Jan. 18, 2007

(86) PCT No.: PCT/JP2007/050643

§ 371 (c)(1),
(2), (4) Date: Jul. 16, 2008

(87) PCT Pub. No.: WO2007/083678

PCT Pub. Date: Jul. 26, 2007

(65) Prior Publication Data

US 2010/0165300 A1    Jul. 1, 2010

(30) Foreign Application Priority Data

Jan. 19, 2006   (JP)   ............... 2006-011302

(51) Int. Cl.
*G01J 3/50*   (2006.01)
(52) U.S. Cl. .................... 250/226; 250/216
(58) Field of Classification Search ........... 250/226, 250/216, 208.1; 353/20, 31, 30, 37; 359/487, 359/485, 495; 349/5, 62
See application file for complete search history.

(56) References Cited

U.S. PATENT DOCUMENTS

| | | | |
|---|---|---|---|
| 4,918,583 A | 4/1990 | Kudo et al. | |
| 6,318,863 B1 | 11/2001 | Tiao et al. | |
| 6,513,953 B1 | 2/2003 | Itoh | |
| 6,739,723 B1 * | 5/2004 | Haven et al. | ............ 353/20 |
| 2001/0028412 A1 | 10/2001 | Ito | |
| 2002/0191287 A1 | 12/2002 | Miyazawa et al. | |
| 2005/0046807 A1 | 3/2005 | Hanano | |
| 2005/0122487 A1 | 6/2005 | Koyama et al. | |
| 2005/0185140 A1 | 8/2005 | Matsubara et al. | |
| 2005/0259229 A1 | 11/2005 | Lee et al. | |
| 2006/0001838 A1 | 1/2006 | Yoshii | |

FOREIGN PATENT DOCUMENTS

| | | |
|---|---|---|
| JP | 8-111107 | 4/1996 |
| JP | 2000-180962 | 6/2000 |
| JP | 2000-214532 | 8/2000 |

(Continued)

*Primary Examiner* — Que T Le
(74) *Attorney, Agent, or Firm* — Hamre, Schumann, Mueller & Larson, P.C.

(57) ABSTRACT

An illumination apparatus includes a light source (1), a first integrator (11) into which light from the light source (1) enters, and a second integrator (33) into which light exiting from the first integrator (11) enters. Accordingly, the aperture shape of the first integrator (11) can be optimally designed, so that the light utilization efficiency can be increased. Furthermore, even when the length of the first integrator (11) is reduced, a deficiency in the light uniformity due to the first integrator (11) is compensated for by the second integrator (33), so that high uniformity can be secured at the surface to be illuminated.

20 Claims, 10 Drawing Sheets

FOREIGN PATENT DOCUMENTS

| | | |
|---|---|---|
| JP | 2000-241769 | 9/2000 |
| JP | 2001-215448 | 8/2001 |
| JP | 2001-281599 | 10/2001 |
| JP | 2003-215344 | 7/2003 |
| JP | 2004-70018 | 3/2004 |
| JP | 2004-326101 | 11/2004 |
| JP | 2005-70443 | 3/2005 |
| JP | 2005-165126 | 6/2005 |
| JP | 2005-234440 | 9/2005 |
| JP | 2005-301139 | 10/2005 |

\* cited by examiner

ILLUMINATION DEVICE WITH PLURAL COLOR LIGHT SOURCES AND FIRST AND SECOND INTEGRATORS

TECHNICAL FIELD

The present invention relates to illumination apparatuses and projection display apparatuses using the same.

BACKGROUND ART

Recently, as a light source of a projection display apparatus (a projector) capable of large screen display, a solid-state light source such as a light emitting diode that can achieve a longer lifetime than a conventional mercury discharge lamp has been receiving attention. An illumination apparatus of such a projection display apparatus is required to provide brighter illumination so as to achieve a high image quality even in a bright room.

Thus, in order to transmit light emitted from the light source to an image display element more efficiently, a reduction of the optical loss in the optical system of the illumination apparatus is being pursued. Moreover, in order to increase the in-plane uniformity of an image that is magnified and projected onto a screen, it is becoming more important to improve the in-plane uniformity of a light beam illuminating the image display element.

To address these issues, a technique by which light radiated from a light source can be efficiently condensed and an illumination light beam can be rendered uniform is proposed in Patent Document 1, for example. FIG. 9 shows a schematic diagram of a conventional optical system described in Patent Document 1.

In this optical system, optically transparent optical blocks 811 to 813 made of glass, acryl, or the like are disposed on the exit end face side of light emitting diodes 801 to 803, which are light sources emitting monochromatic light of three different colors. The optical blocks 811 to 813 each have an exit end having a larger cross-sectional area than that of an entrance end on the side of the light emitting diodes 801 to 803, and the shape of the cross sections is geometrically similar to the shape of an object to be illuminated.

In this configuration, light emitted from the light emitting diodes 801 to 803 first enters the inside of the optical blocks 811 to 813. Subsequently, the light is color-synthesized by a color synthesizing prism 861 or the like, and then illuminates an optical modulator 883, which is the object to be illuminated, via condenser lenses 821 and 881 and a polarization beam splitter 882. The light modulated by the optical modulator 883 is projected onto a screen (not shown) by a projector 884.

Light incident on side faces of the optical blocks 811 to 813 is totally reflected by the side faces within the optical blocks 811 to 813. This is because the optical blocks 811 to 813 are made of a substance having a higher refractive index than the ambient air.

In this case, the number of times of reflection of light ray that enters the optical blocks 811 to 813 at a small angle of incidence within the optical blocks 811 to 813 before the light ray arrives at the exit end of the optical blocks 811 to 813 is small, and the number of times of reflection of a light ray having a large angle of incidence is large.

Accordingly, light arriving at the exit end of the optical blocks 811 to 813 is in a state where light rays that have been reflected different numbers of times are superimposed. Thus, at the exit end of the optical blocks 811 to 813, the uniformity is much improved compared with that at the entrance end face.

An optical element that causes a phenomenon in which light beams are superimposed in this manner is called an integrator. An example of the integrator, such as the optical blocks 811 to 813, is called a tapered rod integrator because such an integrator is an optical component having a tapered shape in which the size at the entrance end and the size at the exit end are different from each other.

Highly uniform light beams exiting from the exit end of the tapered rod integrators 811 to 813 are transmitted in a geometrically similar shape by a lens system disposed between the tapered rod integrators 811 to 813 and the light modulator 883, which is the object to be illuminated, and thus uniformly illuminate the light modulator 883, that is, the object to be illuminated.

Moreover, another technique by which an illumination light beam can be rendered uniform is proposed in Patent Document 2, for example. FIG. 10 shows a schematic diagram of a conventional optical system described in Patent Document 2. In this optical system, light emitted from light emitting diodes 901 to 903 serving as light sources first is collimated by lenses 911 to 913. The collimated wide beams of light are color-synthesized by a three-color synthesizing prism constituted by prisms 961 to 963 and optical thin films 971 and 972.

The color-synthesized light is divided by an optical apparatus called a lens array 933 in which a plurality of lenses are arranged in the same plane. The divided light passes through lenses 941 and 981 and a polarization beam splitter 982, and individual light beams into which the light has been divided are superimposed on a light modulator 983, which is the object to be illuminated, and illuminate the light modulator 983. The light modulated by the light modulator 983 is projected onto a screen (not shown) by a projector 984.

It should be noted that in order to obtain uniformity, typically, the number of lenses within the lens array 933 is about 100 to 200, and a light beam from the light source is divided into 100 to 200 light beams.

At this time, a lens array that is disposed on the light source side is called a first lens array 931, and a lens array that is disposed on the side of the object to be illuminated is called a second lens array 932. The shape of individual first lenses constituting the first lens array 931 is geometrically similar to the shape of the object to be illuminated as is the case with the exit end of the above-described tapered rod integrators. Light beams divided by the individual lenses of the first lens array 931 are each focused onto the object to be illuminated, while being superimposed, by second lenses constituting the second lens array 932 having a corresponding division number. As a result, the optical modulator 983, which is the object to be illuminated, can be uniformly illuminated.

In this manner, even with a configuration in which a lens array is used as the integrator, an optical modulator, which is the object to be illuminated, can be uniformly illuminated.

However, the conventional optical systems as described above have the following problems. In the optical system as shown in FIG. 9, light emitted from the light emitting diodes 801 to 803 enters the respective tapered rod integrators 811 to 813. The light that has entered is reflected within the rod integrators 811 to 813, with the result that the uniformity of the light is improved to some extent, before exiting from the exit apertures. Subsequently, the light that has exited is color-synthesized by the color synthesizing prism 861 or the like so that the optical axes of the light beams radiated from the light sources of the respective colors coincide with one another, and then illuminates the optical modulator 883, which is the object to be illuminated.

At that time, in some cases, unevenness of light emission within the light emitting surface of the individual light emitting diodes 801 to 803 occurs, or there are variations in the light intensity distribution with respect to the angle of light beams radiated from the light emitting diodes 801 to 803.

Furthermore, in order to obtain a larger optical output, a configuration in which plural semiconductor chips, each of which is a light emitting portion of a light emitting diode, are contained within a single package, or a light emitting diode group in which plural packages each containing a single semiconductor chip are arranged side by side may be used as the light source.

Also in these configurations, due to variations in brightness of the semiconductor chips that emit light or due to a gap between the chips or the packages, unevenness of light emission may occur in the light emitting surface of the light source, and due to variations of the individual semiconductor chips, there may be variations in the light intensity distribution with respect to the angle of light radiated from each of the light emitting portions.

At this time, when the difference in the number of times of reflection within the rod integrators 811 to 813 is small for reasons such as the length of each of the tapered rod integrators 811 to 813 being short, the uniformity of exiting light beams becomes insufficient. In this case, the in-plane brightness unevenness of the light beams that illuminate the optical modulator 883 varies from color to color.

Thus, when light radiated from the three light sources 801 to 803 is superimposed, as in the case where a white color is displayed, there is a problem in that the distribution of brightness unevenness on the surface of the optical modulator 883 varies among the three different colors, which causes the in-plane color unevenness when a white color is displayed.

Moreover, the in-plane color unevenness, as described above, at the time when a white color is displayed occurs even when the optical axes of the light emitting diodes 801 to 803, tapered rod integrators 811 to 813 and the color synthesizing prism 861 are slightly misaligned. For this reason, a very high-precision apparatus for adjusting and holding the optical system is needed, and there is a problem in that it also is necessary to address deformation of the holding apparatus caused by the ambient temperature.

Furthermore, to increase the uniformity of light beams exiting from the exit end of the tapered rod integrators 811 to 813 so as to prevent the occurrence of color unevenness as described above, the maximum number of times the light beams are totally reflected by the side faces within the tapered rod integrators 811 to 813 should be as large as possible.

In order to obtain the same uniformity as a common lens array that divides a light beam emitted from a light source into 100 to 200 light beams, it is necessary that the maximum number of times of reflection within a rod integrator is about five to ten, and in order to obtain sufficient uniformity, it often is necessary that the maximum number of times of reflection is more than ten. Therefore, the rod integrator is required to have a long optical path length in the optical axis direction, or in other words, a long optical block is needed.

However, a long tapered rod integrator is expensive. In addition, when the rod integrator is excessively long relative to the cross-sectional area, the rod integrator is elongated, and thus the possibility of breakage or the like increases when the rod integrator is held.

Moreover, in the optical system as shown in FIG. 10, the lenses 911 to 913 that condense light emitted from the light emitting diodes 901 to 903 are required to capture the light emitted from the light emitting diodes 901 to 903 efficiently and allow the light to exit toward the subsequent optical system. At the same time, the lenses 911 to 913 are required to increase the parallelism of the light exiting from the lenses 911 to 913 and reduce the optical loss in the lens array 933 and the optical system thereafter.

In order to condense light emitted from the light emitting diodes 901 to 903 efficiently, it is advantageous that the distance between the light emitting diodes 901 to 903 and the respective lenses 911 to 913 is decreased. On the other hand, in order to increase the parallelism of light exiting from the lenses 911 to 913, it is advantageous that the distance between the light emitting diodes 901 to 903 and the respective lenses 911 to 913 is increased. That is to say, it is difficult to increase the parallelism and to efficiently condense light at the same time.

As described above, in an illumination apparatus that illuminates a predetermined surface to be illuminated with light emitted from a solid-state light source such as a light emitting diode, it is difficult to construct a more efficient and more uniform illumination system using components that are cheap and have a small possibility of breakage when, for example, the components are held.

Patent Document 1: JP 2000-180962 A
Patent Document 2: JP 2004-70018 A

DISCLOSURE OF INVENTION

The present invention has been conceived to solve the conventional problems as described above, and it is an object thereof to provide an illumination apparatus that more efficiently can utilize a light beam emitted from a solid-state light source serving as a light source even in a state where the uniformity with respect to in-plane brightness is increased at a region to be illuminated, and a projection display apparatus using the illumination apparatus.

In order to achieve the object, an illumination apparatus of the present invention includes a light source, a first integrator into which light from the light source enters, and a second integrator into which light exiting from the first integrator enters.

A projection display apparatus of the present invention is provided with the illumination apparatus, the projection display apparatus including an image display means for forming an image by modulating illumination light from the illumination apparatus and a projector for projecting light modulated by the image display means onto a screen.

DESCRIPTION OF THE INVENTION

Figure 1:
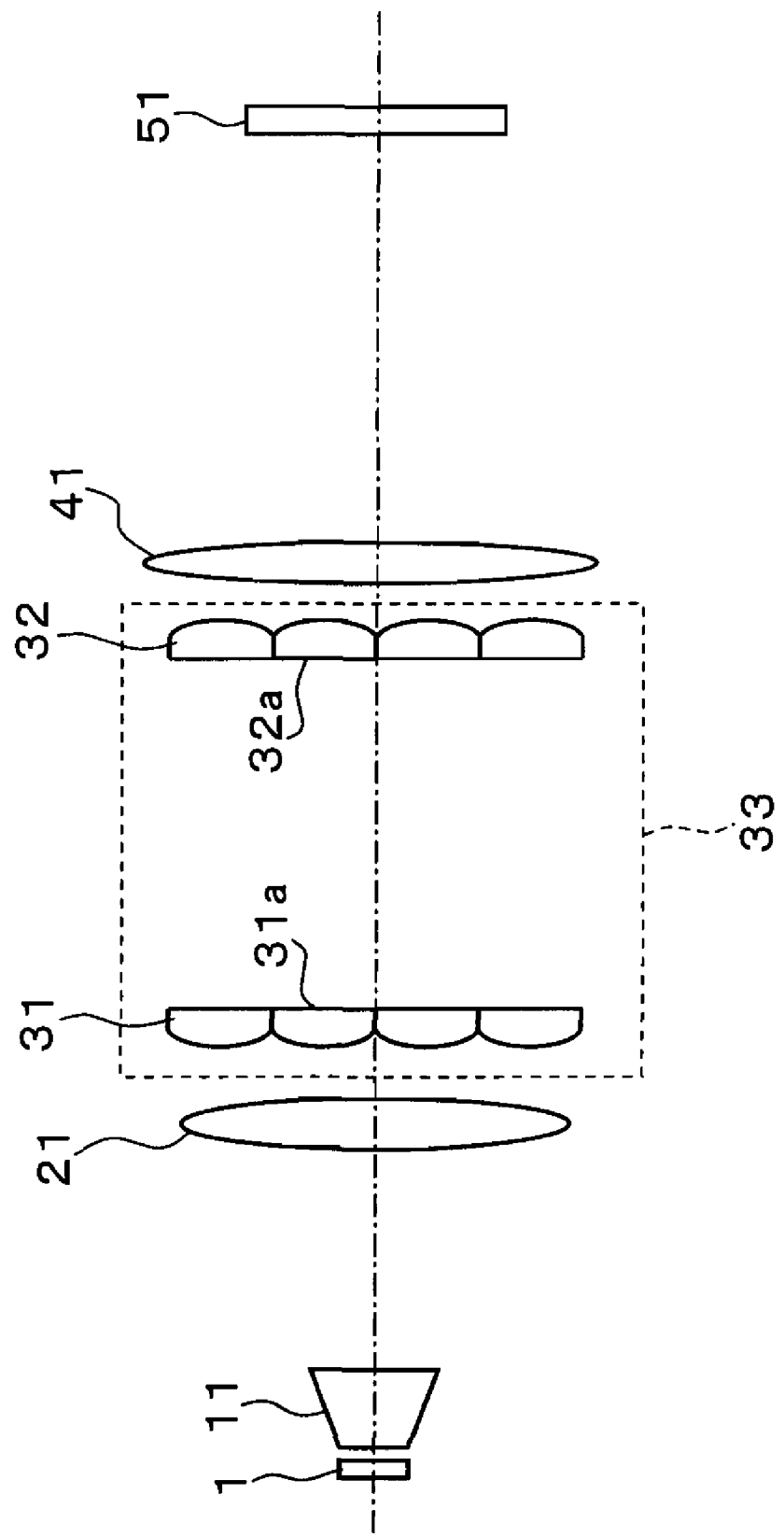
FIG. 1 is a diagram schematically showing a configuration of an illumination apparatus according to Embodiment 1 of the present invention.

According to the illumination apparatus and the projection display apparatus of the present invention, it is possible to obtain sufficient uniformity while increasing the light utilization efficiency. More specifically, since the second integrator is provided in addition to the first integrator, the aperture shape of the first integrator can be optimally designed, so that the light utilization efficiency can be increased. Furthermore, even when the length of the first integrator is reduced, a deficiency in the light uniformity due to the first integrator can be compensated by the second integrator, so that high uniformity can be secured at the surface to be illuminated.

Moreover, according to a second illumination apparatus and first and second projection display apparatuses that are provided with light sources of three colors, in addition to the above-described effects, color unevenness that occurs during color synthesis can be rendered uniform by the second integrator.

In the above-described illumination apparatus, it is preferable that a lens means for condensing light exiting from the first integrator is provided between the first integrator and the second integrator. With this configuration, the parallelism of a light beam that has exited from the first integrator and that enters the second integrator can be increased.

Moreover, it is preferable that the light source includes a first light source emitting light of a first color, a second light source emitting light of a second color, and a third light source emitting light of a third color; and the first integrator includes a first integrator for the first light source into which light from the first light source enters, a first integrator for the second light source into which light from the second light source enters, and a first integrator for the third light source into which light from the third light source enters, the apparatus further including a first optical thin film that synthesizes light of the first color and light in which light of the second color and light of the third color are color-synthesized, and a second optical thin film that synthesizes light of the second color and light of the third color, wherein light synthesized by the first optical thin film enters the second integrator. With this configuration, color unevenness that occurs during color synthesis can be rendered uniform by the second integrator.

In the first and second illumination apparatuses, it is preferable that the first integrator is a rod integrator. With this configuration, the uniformity of a light beam can be improved with a simple structure.

Moreover, it is preferable that the first integrator is a rod integrator, and the rod integrator is a tapered rod integrator with the aperture shape of the exit end being larger than that of the entrance end.

Moreover, it is preferable that the first integrator is a rod integrator, and the maximum number of times of reflection of an effective light ray of light emitted from the light source that arrives at a region to be illuminated within the first integrator is ten or less. With this configuration, the length of the rod integrator can be reduced, so that it is possible to prevent breakage when, for example, the rod integrator is held while suppressing the cost.

Moreover, it is preferable that the second integrator is a lens array.

Moreover, it is preferable that the second integrator is a rod integrator.

Moreover, it is preferable that the second integrator is a lens array including a first lens array that is disposed on the side of the light source and a second lens array that is disposed on the side of an object to be illuminated, and the shape of the exit aperture of the first integrator and a light source image formed on the second lens array are geometrically similar.

Moreover, the light source may be formed from a plurality of light emitting portions. With this configuration, it is possible to obtain a larger optical output and to obtain sufficient uniformity while increasing the light utilization efficiency.

Moreover, in the projection display apparatus, it is preferable that the light source includes a first light source emitting light of a first color, a second light source emitting light of a second color, and a third light source emitting light of a third color; the first integrator includes a first integrator for the first light source into which light from the first light source enters, a first integrator for the second light source into which light from the second light source enters, and a first integrator for the third light source into which light from the third light source enters; the second integrator includes a second integrator for the first light source into which light exiting from the first integrator for the first light source enters, a second integrator for the second light source into which light exiting from the first integrator for the second light source enters, and a second integrator for the third light source into which light exiting from the first integrator for the third light source enters; and the image display means includes an image display means for the first light source that forms an image by modulating illumination light from the second integrator for the first light source, an image display means for the second light source that forms an image by modulating illumination light from the second integrator for the second light source, and an image display means for the third light source that forms an image by modulating illumination light from the second integrator for the third light source, the projection display apparatus further including a color synthesizing prism for synthesizing light modulated by the image display means for the first light source, light modulated by the image display means for the second light source, and light modulated by the image display means for the third light source, wherein the projector projects light exiting from the color synthesizing prism onto the screen. With this configuration, color unevenness that occurs during color synthesis can be rendered uniform by the second integrator.

Hereinafter, embodiments of the present invention specifically will be described with reference to the drawings.

Embodiment 1

FIG. 1 is a diagram schematically showing a configuration of an illumination apparatus according to Embodiment 1. A light emitting diode 1 is a light source having a predetermined light emitting surface. A tapered rod integrator (hereinafter referred to as a "tapered rod") 11, which is a first integrator, is disposed at such a position that light emitted from the light emitting diode 1 is incident on the tapered rod 11.

A relay lens 21, which is a lens means, is disposed between the tapered rod 11 and a lens array 33, which is a second integrator. Light exiting from the lens array 33 is condensed by a condensing lens 41 and illuminates a surface 51 to be illuminated.

The angle of light rays emitted from the light emitting diode 1 is 0° to 90°. The closer the entrance end of the tapered rod 11 is to the light emitting diode 1, the greater the amount of light that can be taken in the tapered rod 11. Therefore, it is desirable that the entrance end of the tapered rod 11 is in close proximity to the light emitting diode 1 or adhered to the light emitting diode 1 via an adhesive or the like having a high optical transmittance.

However, in some cases, an electrode or a wiring on the surface of the light emitting diode 1 is disposed on the side of the exit face of the light emitting diode 1. Moreover, the light emitting diode 1 often is packaged in resin, glass, or the like. In these cases, it is desirable that the entrance end of the tapered rod 11 is disposed as close to the light emitting diode 1 as possible.

The tapered rod 11 is made of, for example, glass. Light from the light emitting diode 1 enters the tapered rod 11 and then travels to the exit end of the tapered rod 11 while passing through the inside of the tapered rod 11 or being totally reflected. Among the rays of light from the light emitting diode 1, light rays that enter the tapered rod 11 at a small angle of incidence are reflected a few times before arriving at the exit end. On the other hand, light rays that enter the tapered rod 11 at a large angle of incidence are reflected many times.

Thus, light arriving at the exit end of the tapered rod 11 is in a state where light rays that have been reflected different numbers of times are superimposed. Accordingly, at the exit end of the tapered rod 11, the uniformity is improved when compared with that at the entrance end. The longer the tapered rod 11 is, the greater the number of times of reflection of a light ray that has entered the tapered rod 11 at a large angle becomes. In this case, more light rays that have been reflected different numbers of times are superimposed, so that the uniformity at the exit end is increased. On the other hand, when the tapered rod 11 is made longer, the tapered rod 11 becomes expensive, and there is also a possibility that the tapered rod 11 will be broken when, for example, the tapered rod 11 is held.

In the present embodiment, in addition to the tapered rod 11, the lens array 33, which is an optical means for superimposing divided light beams at the surface to be illuminated, is used. As a result, the aperture shape of the tapered rod 11 can be designed optimally in accordance with the shape of the light emitting diode 1, so that the light utilization efficiency can be increased.

Furthermore, by shortening the tapered rod 11, the cost is suppressed and also its breakage or the like is avoided. At the same time, a deficiency in the light uniformity due to the short tapered rod 11 is compensated by the lens array 33, so that high uniformity is secured at the surface to be illuminated.

That is to say, according to the present embodiment, sufficient uniformity can be obtained while achieving higher light utilization efficiency than in the cases where merely a conventional long tapered rod is used or merely a lens array is used. In the following description, this will be explained more specifically.

First, in an illumination apparatus in which merely a conventional long tapered rod is used, the exit end of the tapered rod and the surface to be illuminated are conjugate to each other. For this reason, it is necessary that the shape of the exit end of the tapered rod and the shape of the surface to be illuminated are geometrically similar. Furthermore, when the entrance end and the exit end of the tapered rod are geometrically similar, the numbers of times of reflection within the tapered rod in the vertical direction and in the lateral direction become equal. As a result, the external shape of the exiting light beam is substantially circular and matches the subsequent optical system well, so that high efficiency can be achieved.

In short, in order to configure an efficient illumination system in the tapered rod and the optical system thereafter, it is important that, regardless of the shape of the light emitting diode, the shapes of the exit end and the entrance end of the tapered rod are geometrically similar to the shape of the surface to be illuminated. However, in the case where there is a big difference between the shape of the light emitting diode and the shape of the surface to be illuminated, when the shape of the surface to be illuminated and the shapes of the exit end and the exit end of the tapered rod are geometrically similar, the shape of light emitted from the light emitting diode is greatly different from the shape of the entrance end of the tapered rod.

That is to say, in this configuration, the relationship between the shape of light emitted from the light emitting diode and the shape of the entrance end of the tapered rod is a relationship that causes an optical loss and decreases the light utilization efficiency. Accordingly, by using merely a long tapered rod, high light utilization efficiency may not be obtained in the case where there is a big difference between the shape of the light emitting diode and the shape of the surface to be illuminated.

According to the illumination apparatus of the present embodiment, even in the case where there is a big difference between the shape of the light emitting diode 1 and the shape of the surface 51 to be illuminated, high light utilization efficiency can be obtained. The reason for this is as follows. In the present embodiment, it is not necessary to make the shape of the exit end of the tapered rod 11 geometrically similar to the shape of the surface 51 to be illuminated, and the shapes of the entrance end and the exit end of the tapered rod 11 can be optimum shapes to condense more efficiently as much of the light from the light emitting diode 1 as possible.

This will be described more specifically. In the present embodiment, the exit end of the tapered rod 11 and the surface 51 to be illuminated are not conjugate to each other. In the present embodiment, each of first lenses 31a of the first lens array 31 that is disposed on the light source side in the lens array 33 and the surface 51 to be illuminated are conjugate to each other. Moreover, the aperture shape of the exit end of the tapered rod 11 and a light source image formed on the second lens array 32 that is disposed on the side of the surface 51 to be illuminated are conjugate to each other so that the aperture shape is substantially geometrically similar to the light source image. That is to say, the aperture shape of the exit end of the tapered rod 11 is not restricted by the shape of the surface 51 to be illuminated and can be designed freely.

Thus, it is possible to design the tapered rod 11 in such a manner that the aperture shape of the entrance end of the tapered rod 11 is determined in accordance with the shape of the light emitting diode 1 and the aperture shape of the exit end is made geometrically similar to the aperture shape of the entrance end. In other words, the aperture shape of the tapered rod 11 can be optimally designed in accordance with the shape of the light emitting diode 1, and thus the light utilization efficiency can be increased.

Herein, in the lens array 33, a light beam incident on the first lens array 31 is divided by the individual first lenses 31a constituting the first lens array 31 disposed on the light source side. The divided light beams that have passed through the first lenses 31a are allowed to superimpose illumination shapes geometrically similar to the shape of the first lenses 31a at the surface 51 to be illuminated by corresponding second lenses 32a of the second lens array 32. As a result, the surface 51 to be illuminated can be uniformly illuminated.

In this case, the shape of the first lenses 31a of the first lens array 31 can be geometrically similar to the shape of the surface 51 to be illuminated. Therefore, according to the present embodiment, even when the aperture shape of the tapered rod 11 is designed optimally in accordance with the shape of the light emitting diode 1, the shape of the first lenses 31a is not restricted by the aperture shape of the tapered rod 11. Thus, it is possible to achieve an increase of the light utilization efficiency by optimally designing the aperture shape of the tapered rod 11 as well as an increase the uniformity of illumination by the lens array 33.

Moreover, it is desirable that the light beam incident on the first lens array 31 consists of light rays that are as parallel as possible. For this reason, a relay lens 21 for increasing the parallelism of light exiting from the tapered rod 11 is disposed between the tapered rod 11 and the first lens array 31.

Moreover, in the case where the lens array 33 is used, all that is required of the second lens array 32 disposed on the side of the surface 51 to be illuminated is to allow the divided light beams exiting from the corresponding first lenses 31a of the first lens array 31 to arrive at the surface 51 to be illuminated. For this reason, the shape of the second lenses 32a is not restricted by the shape of the surface 51 to be illuminated, so that the shape of the second lenses 32a can be designed in accordance with the shape of a diaphragm in the optical system and the mechanical configuration.

It should be noted that in order to obtain the same uniformity as that of an illumination apparatus in which merely a common lens array that divides a light beam emitted from a light source into 100 to 200 light beams is used, it often is necessary for the maximum number of times of reflection of an effective light ray of the rays of light emitted from the light source that passes through the optical system such as the relay lens and arrives at a region to be illuminated within the rod integrator to be about five to ten, and more than ten when sufficient uniformity is to be obtained.

According to the present embodiment, also the lens array 33 provides the effect of improving the uniformity, so that the tapered rod 11 immediately after the light emitting diode 1 can be shortened. More specifically, even when the maximum number of times of reflection within the tapered rod 11 is ten or less, the uniformity improving effect of the lens array 33 makes it possible for the apparatus as a whole to achieve the same uniformity as that in the case where a tapered rod 11 within which light is reflected ten or more times is used. Therefore, according to the present embodiment, the maximum number of times of reflection within the tapered rod 11 can be as small as ten or less, and even a tapered rod 11 within which light is reflected five times or less, or three times or less can be used.

In the following, supplemental descriptions of the tapered rod, the light emitting diode, the lens array, the relay lens, and the condensing lens will be provided. These supplemental descriptions also apply to embodiments described later.

An example in which the tapered rod 11 is made of glass was described. However, the tapered rod 11 can be made of any optically transparent substance having a higher refractive index than the ambient air, and in addition to glass, an acrylic resin or other materials also may be used.

Moreover, even when the tapered rod 11 is a hollow rod integrator enclosed by four mirrors, the same effects can be obtained. In this case, light incident on side faces of the rod integrator when passing through the inside of the rod integrator is reflected specularly instead of being totally reflected before arriving at the exit end.

Moreover, in order to obtain a larger optical output, the light emitting diode, which is the light source, may have a configuration in which plural semiconductor chips, each of which is a light emitting portion of a light emitting diode, are contained in a single package, or may be a light emitting diode group in which plural packages each containing a single semiconductor chip are arranged side by side.

In these configurations, for example, due to variations in brightness among the semiconductor chips that emit light or due to a gap between the chips or the packages, unevenness of light emission sometimes occurs at the light emitting surface of the light source, and due to variations among the individual semiconductor chips, there are sometimes variations in the light intensity distribution with respect to the angle of light radiated from each of the light emitting portions.

Even in these cases where the unevenness of light emission or the unevenness of light intensity distribution occurs when the light source is formed from a plurality of light emitting portions, the unevenness of light emission or the unevenness of light intensity distribution can be addressed in the same manner as unevenness of light emission or unevenness of the light intensity distribution with respect to the angle within a single light emitting body. Thus, sufficient uniformity can be obtained while increasing the light utilization efficiency.

Moreover, the light source is not limited to the light emitting diode, and it is also possible to have a laser light source, an organic EL device, or other light sources having a predetermined light emitting surface.

Moreover, the aperture shape of each of the lenses 32a of the second lens array 32 that is disposed on the side of the surface 51 to be illuminated is not restricted by the shape of the surface 51 to be illuminated and can be designed freely, as is the case with the aperture shape of the exit end of the tapered rod 11.

Moreover, an example in which the relay lens 21 is disposed between the tapered rod 11 and the lens array 33 was described. As described above, the relay lens 21 is provided in order to increase the parallelism of a light beam that has been emitted from the light emitting diode 1 and that enters the first lens array 31. Accordingly, the relay lens 21 is not necessarily provided. When provided, the relay lens 21 also may be constituted by two or more lenses.

Moreover, an example in which the condensing lens 41 is disposed between the second lens array 32 and the surface 51 to be illuminated was described. As described above, the condensing lens 41 is provided in order to condense light beams exiting from the lenses 32a of the second lens array 32 onto the surface to be illuminated. The same effect also can be obtained by decentering each of the lenses 32a of the second lens array 32 by a predetermined amount. Therefore, the condensing lens 41 is not necessarily required. When provided, the condensing lens 41 also may be constituted by two or more lenses.

Embodiment 2

Figure 2:
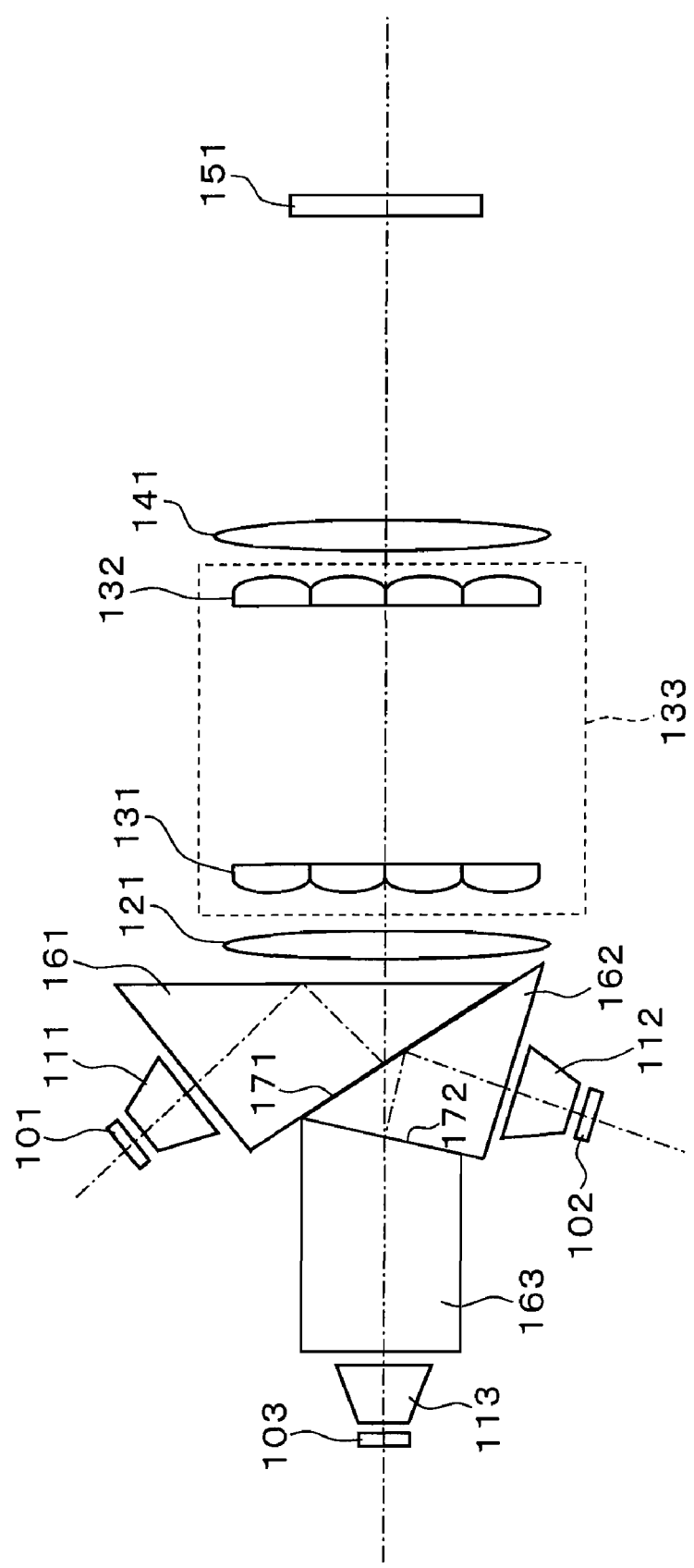
FIG. 2 is a diagram schematically showing a configuration of an illumination apparatus according to a first example of Embodiment 2 of the present invention.

FIG. 2 is a diagram schematically showing a configuration of an illumination apparatus according to a first example of Embodiment 2. The description of overlapping portions with Embodiment 1 will be omitted, and portions different from Embodiment 1 will be described in detail. In the present embodiment, three light sources emitting light of different colors are used, that is, a red light emitting diode 101, a blue light emitting diode 102, and a green light emitting diode 103 are used.

The optical system from the light emitting diodes 101 to 103 to a portion immediately before a lens array 133 is used as an optical system of the light emitting diodes 101 to 103. Furthermore, in order to synthesize light beams of respective colors, a three-color synthesizing prism is provided. The three-color synthesizing prism is constituted by first to third prisms 161 to 163, which are color synthesizing prisms, and first and second optical thin films 171 and 172 (dichroic filters).

The first prism 161 and the second prism 162 are triangle prisms, and the third prism 163 is a trapezoidal prism. The first prism 161 has an exit surface from which light in which the three colors are synthesized exits. The first optical thin film 171 (the dichroic filter) having a cutoff wavelength between the green light spectrum and the red light spectrum is formed on the surface of the first prism 161 that faces the second prism 162. An air layer (not shown) is interposed between the first optical thin film 171 and the second prism 162.

Moreover, the second optical thin film 172 (the dichroic filter) having a cutoff wavelength between the blue light spectrum and the green light spectrum is formed on the surface of the second prism 162 that faces the third prism 163. The second optical thin film 172 and the third prism 163 are adhered to each other.

Red light and light in which the three colors of the light of three colors, that is, blue light, green light, and red light, are synthesized propagate within the first prism 161, blue light and light in which blue light and green light are color-synthesized propagate within the second prism 162, and only green light propagates within the third prism 163. In this manner, the first to third prisms 161 to 163 are disposed in that order from the exit side from which the light in which the three colors are synthesized exits toward the side of the green light emitting diode 103.

As shown in FIG. 2, green light emitted from the green light emitting diode 103 is condensed by a relatively short tapered rod 113, enters the inside of the third prism 163, and arrives at the surface on which the second optical thin film 172 is formed. Moreover, blue light emitted from the blue light emitting diode 102 is condensed by a relatively short tapered rod 112, enters the inside of the second prism 162, and is totally reflected by the air layer between the first optical thin film 171 and the second prism 162 to arrive at the surface on which the second optical thin film 172 is formed.

The cutoff wavelength of the second optical thin film 172, which is formed on the surface at which the blue light emitted from the blue light emitting diode 102 and the green light emitted from the green light emitting diode 103 arrive, is shifted due to the dependence on the angle of incidence of incident light.

More specifically, with the distance from the optical axis toward the periphery, the angle of incidence changes increasingly, and thus the spectral characteristics differ between a portion on the optical axis and a portion at the periphery. For example, when the angle of incidence of light incident on the second optical thin film 172 varies by about 10°, the cutoff wavelength of the second optical thin film 172 is shifted by about 20 nm.

In this manner, depending on the angle of incidence of light rays incident on the optical thin film, the cutoff wavelength is shifted, and as a result, light that has passed through the optical thin film contains light rays having color unevenness. This also applies to the first optical thin film 171, and light that has passed through the optical thin film contains light rays having color unevenness.

Figure 9:
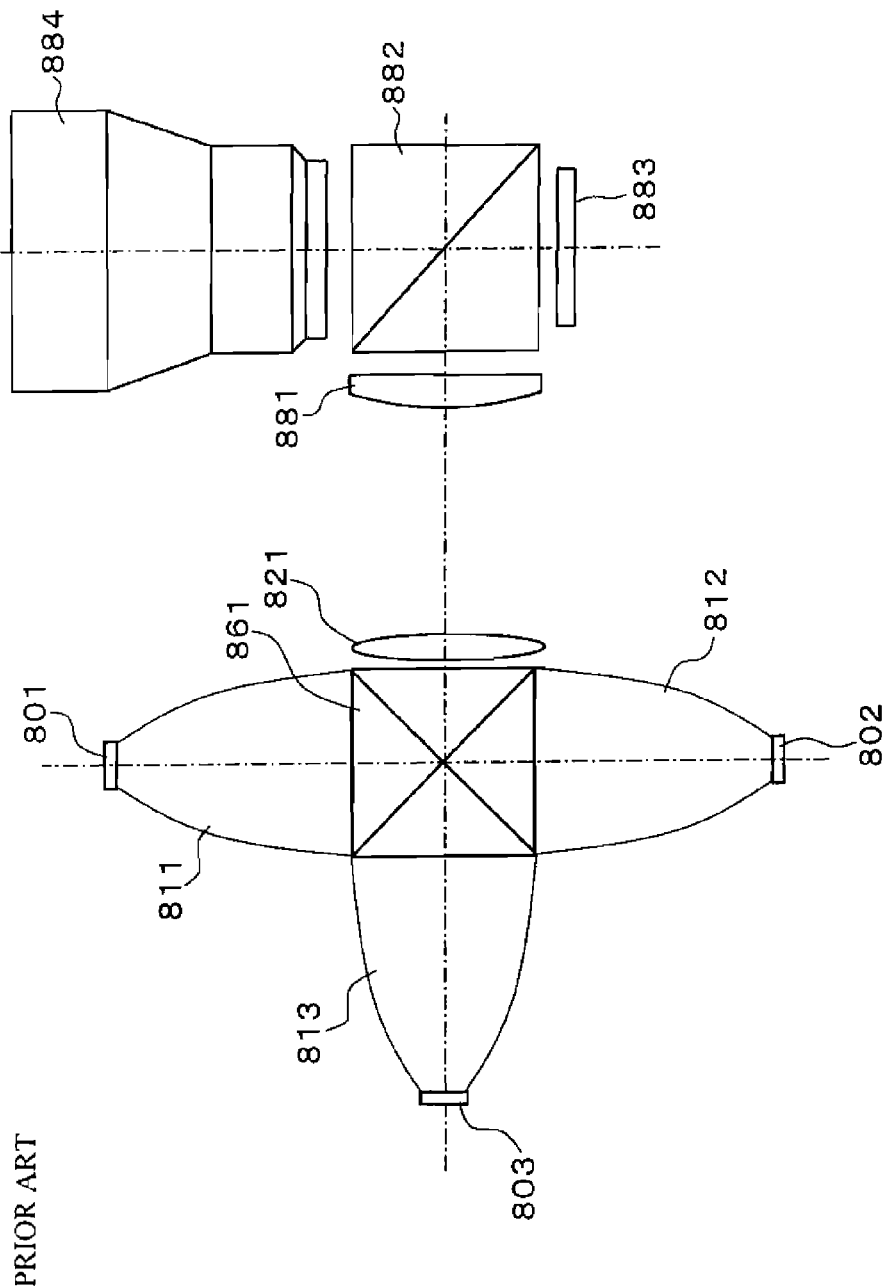
FIG. 9 is a diagram schematically showing a configuration of an example of a conventional illumination apparatus.

In the conventional configuration shown in FIG. 9, in which light of three colors is condensed only by the long tapered rods and then the three colors are synthesized, light with color unevenness that has occurred when the light has passed through the optical thin films is irradiated on the surface 883 to be illuminated as it is without being rendered uniform. Thus, color unevenness occurs at the surface 883 to be illuminated.

Figure 10:
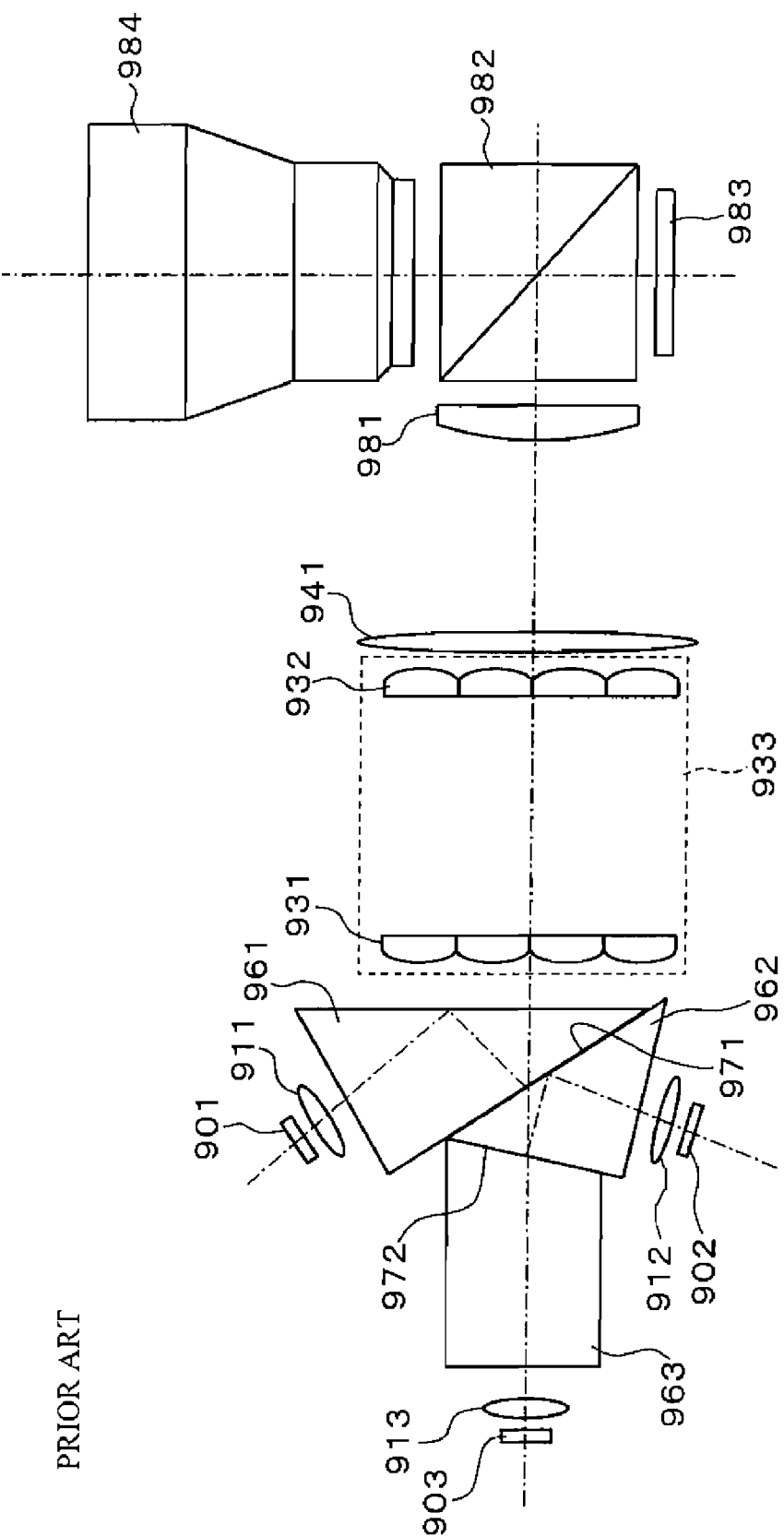
FIG. 10 is a diagram schematically showing a configuration of another example of the conventional illumination apparatus.

Moreover, in the conventional configuration shown in FIG. 10, the lens array 933 is provided after the three-color synthesizing system, so that color unevenness at the surface 983 to be illuminated is rendered uniform. However, it is difficult efficiently to condense light emitted from the light emitting diodes 901 to 903.

In the present embodiment, the length of the tapered rods 111 to 113 is reduced as in Embodiment 1. Furthermore, the shapes of the entrance end and the exit end of the tapered rods 111 to 113 are optimized so that light emitted from the light emitting diodes 101 to 103 can be condensed with higher efficiency.

In the present embodiment, the lens array 133 is provided after the three colors are synthesized by the optical thin films such as the three-color synthesizing prism, and thus light with color unevenness that has occurred when the light of three colors has passed through the optical thin films 171 and 172 is prevented from being illuminated as it is. As a result, an illumination light beam in which color unevenness is rendered uniform can be transmitted to the surface to be illuminated.

Figure 3:
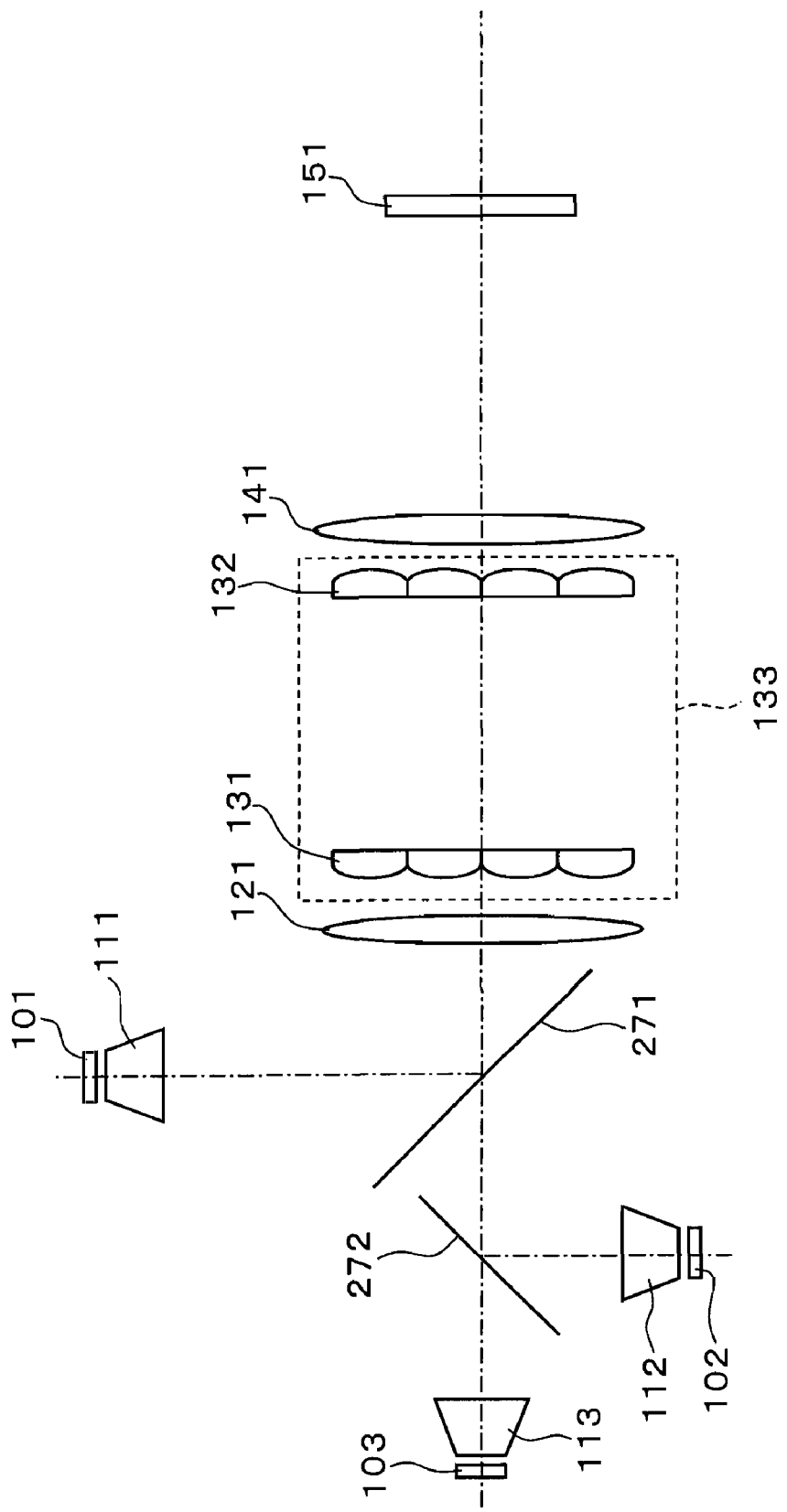
FIG. 3 is a diagram schematically showing a configuration of an illumination apparatus according to a second example of Embodiment 2 of the present invention.

FIG. 3 is a diagram schematically showing a configuration of an illumination apparatus according to a second example of Embodiment 2. Components having the same configuration as those in FIG. 2 are denoted by the same reference numerals, and the description thereof will be omitted. FIG. 3 shows a configuration in which, instead of the three-color synthesizing prism, dichroic mirrors 271 and 272 are used to synthesize light from the light sources of three colors.

The dichroic mirror 272 passes green light emitted from the light emitting diode 103 and reflects blue light emitted from the light emitting diode 102, thereby synthesizing the green light and the blue light. The dichroic mirror 271 passes the synthesized light of the green light and the blue light, which have been synthesized by the dichroic mirror 272, and reflects red light emitted from the light emitting diode 101, thereby synthesizing the light of three colors. Also in this second example, the same effects as in the first example can be obtained.

Table 1 below shows the simulation results of an optical system according to a working example having the configuration shown in FIG. 2 and a comparative example in which merely a tapered rod is used to improve uniformity. In both of the working example and the comparative example, the maximum number of times an effective light ray arriving at the region to be illuminated is reflected within the tapered rod is five.

In Table 1, the light utilization efficiency is taken to be 100% in the working example. The variation in illuminance of each color between the left side and the right side of the screen surface indicates the variation in illuminance between the left side and the right side of the screen surface when an image is projected onto a screen using a projection lens, and the illuminance is taken to be 100% at the center.

TABLE 1

|  | Working example | Comparative example |
|---|---|---|
| Light utilization efficiency ratio | 100% | 95% |
| Variation in illuminance between the left side and the right side of the screen surface (Red) | 95%-100%-95% | 103%-100%-95% |
| Variation in illuminance between the left side and the right side of the screen surface (Green) | 96%-100%-96% | 94%-100%-103% |
| Variation in illuminance between the left side and the right side of the screen surface (Blue) | 96%-100%-96% | 113%-100%-84% |

As can be seen from Table 1, in the working example, the light utilization efficiency is about 5 percent higher than that in the comparative example. Moreover, a variation in illuminance in the left-and-right direction of the screen surface is found in both of the working example and the comparative example. However, in the working example, among the three colors, the uniformity is almost equal, and the imbalance between the left side and the right side is small.

On the other hand, in the comparative example, in some cases, the amount of variation is smaller than that in the working example. However, in some cases, the amount of variation is conversely larger than that in the working example, so that the comparative example lacks consistency. Furthermore, the imbalance in the left-and-right direction with respect to the center varies widely among the three colors. More specifically, it can be seen that in the comparative example, when a white color is displayed, that is, when the three colors are superimposed, in-plane color unevenness is increased.

Herein, the simulation results in Table 1 confirm the effects of Embodiment 2. Embodiment 1 and Embodiment 2 have the same configuration except for the configuration for synthesizing the three colors. Accordingly, it can be considered that the aspect of the light utilization efficiency being excellent and the aspect of there being no imbalance in the left-and-right direction with respect to the center are also effects of Embodiment 1.

In the following, supplemental descriptions of the three-color synthesizing prism and the light sources will be provided. These supplemental descriptions also apply to embodiments described later.

Regarding the three-color synthesizing prism, the positions of the light sources and the optical thin films are not limited to the above-described example, and any configuration in which light from the light sources of three colors is synthesized can be used.

Moreover, as the light sources, the red light emitting diode 101, the blue light emitting diode 102, and the green light emitting diode 103 were used. However, the light sources that emit light of three different colors are not limited to the light emitting diodes. For example, as the light of three different colors, monochromatic light that is separated from white light and that has a high color purity (a narrow spectral bandwidth) also can be used.

Moreover, the light of three different colors is not limited to light of the three colors, that is, blue, green, and red. For example, light of three colors that are close to each other in the spectrum, such as bluish green light, green light, and yellowish green light, also can be used. In short, the used light can be light of three different regions in the spectrum.

Furthermore, the number of different colors was set to three. However, by changing the shape and the transmission/reflection spectral characteristics of the dichroic mirrors, the color synthesizing prism, or the like of the color synthesizing portion, it is also possible to use light sources of three or more colors, for example, light sources of bluish green, yellow, orange, and the like in addition to blue, green, and red, and synthesize those colors.

Embodiment 3

Figure 4:
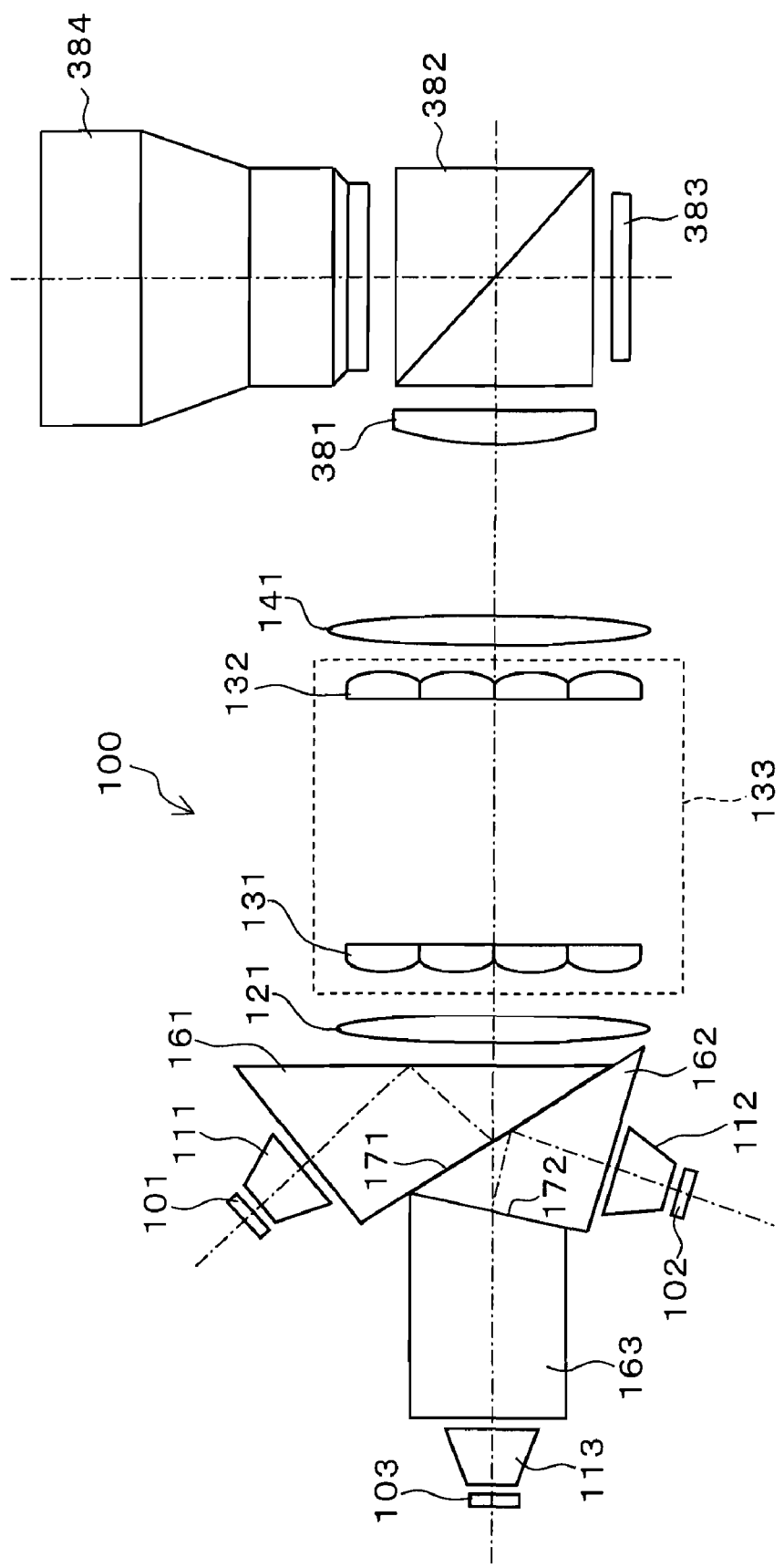
FIG. 4 is a diagram schematically showing a configuration of a projection display apparatus according to Embodiment 3 of the present invention.

FIG. 4 is a diagram schematically showing a configuration of a projection display apparatus according to Embodiment 3. As shown in FIG. 4, the projection display apparatus of the present embodiment includes an optical means constituted by an illumination apparatus 100 and a field lens 381, a beam splitter 382 for separating light of an illumination system and light of a projection system, an image display element 383 serving as an image display means for forming an image by modulating illumination light from the illumination apparatus, and a projection lens 384 serving as a projector for projecting light modulated by the image display element 383 onto a screen (not shown). As the illumination apparatus 100, the illumination apparatus shown in FIG. 2 of Embodiment 2 is used, and components thereof are denoted by the same reference numerals.

Hereinafter, the operation of the projection display apparatus shown in FIG. 4 will be described. First, by the illumination apparatus 100, light of three different colors emitted from the red light emitting diode 101, the blue light emitting diode 102, and the green light emitting diode 103 is condensed efficiently by the tapered rods 111 to 113 and enters the three-color synthesizing prism.

The light of different colors synthesized within this three-color synthesizing prism exits as light on the same optical axis. The synthesized light exiting from the illumination apparatus 100 is reflected by the beam splitter 382 and illuminated onto the image display element 383, which in turn modulates the illumination light and forms an image.

In this case, light from the light sources of the different colors that has exited from the illumination apparatus 100 is uniformly illuminated onto the image display element 383. The light that has been modulated by the image display element 383 passes through the beam splitter 382 as it is and is projected onto the screen by the projection lens 384.

At this time, when the red light emitting diode 101, the blue light emitting diode 102, and the green light emitting diode 103, which emit light of three different colors, are lit at the same time, the image display element 383 is illuminated with white light, and when each of the light emitting diodes is lit alone, the image display element 383 is illuminated with the corresponding monochromatic light. As a result, the image formed by the image display element 383 is shown on the screen as a full-color picture.

In the projection display apparatus of the present embodiment, the illumination apparatus shown in FIG. 2 of Embodiment 2 is used as the illumination apparatus 100. Therefore, an image that has been illuminated more brightly, and furthermore, uniformly with little brightness unevenness and color unevenness, can be projected onto the screen.

It should be noted that the illumination apparatus is not limited to the configuration shown in FIG. 2. For example, the configuration shown in FIG. 1 of Embodiment 1 or the configuration shown in FIG. 3 of Embodiment 2 also may be used.

Moreover, in the present embodiment, a projection display apparatus having a configuration including the optical means constituted by the field lens 381 and the three-color synthesizing prism and the beam splitter 382 for separating light of the illumination system and light of the projection system was described as an example. However, it is sufficient that the image display element 383 is illuminated by the illumination apparatus. Therefore, a configuration that does not include the optical means, the beam splitter, or the like also may be used.

A possible example of such a configuration is a configuration in which a transmission image display element (e.g., a transmission liquid crystal) is disposed in the portion of the region 51 (151) to be illuminated in FIG. 1 and a projection lens is disposed behind (on the side opposite that of the light sources) the transmission image display element.

Moreover, in the present embodiment, a configuration including a single image display element 383 was described as an example. However, a configuration including three image display elements may also be used.

Embodiment 4

Figure 5:
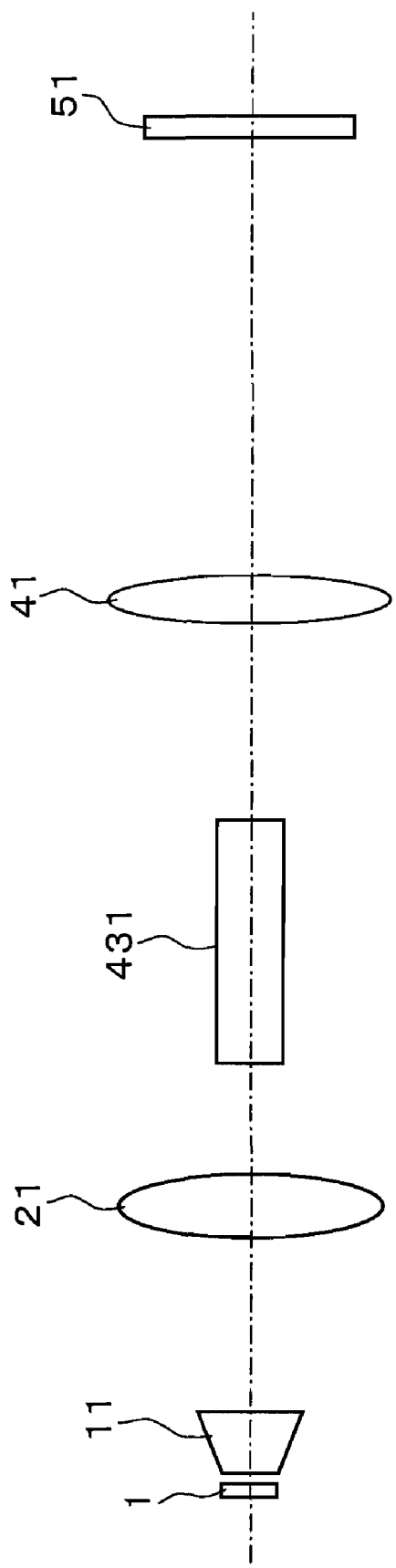
FIG. 5 is a diagram schematically showing a configuration of an illumination apparatus according to Embodiment 4 of the present invention.

FIG. 5 is a diagram schematically showing a configuration of an illumination apparatus according to Embodiment 4. In the configuration of FIG. 5, the lens array 33 of the illumination apparatus shown in FIG. 1 of Embodiment 1 is replaced by a rod integrator 431. Components having the same configuration as those in FIG. 1 are denoted by the same reference numerals, and the description thereof will be omitted.

The second rod integrator 431 is made of glass and is mainly for the purpose of improving the uniformity by total reflection within the second rod integrator 431. As in the configuration shown in FIG. 1 of Embodiment 1, in the case where the lens array 33 is used as a second integrator, the number of the first lenses 31a constituting the first lens array 31 can be increased in order to improve the uniformity. In this case, when the size of the individual lenses is extremely decreased, lens molding may be difficult.

In the case where the second rod integrator 431 is used as in the present embodiment, unlike the lens array, the uniformity can be improved using the difference in the number of times of total reflection of light entering the second rod integrator 431. Even though the cost is slightly increased, the uniformity can be improved by simply increasing the length of the second rod integrator 431.

Moreover, in the case where the rod length is long relative to the cross-sectional area, that is, the rod is elongated, the cross-sectional area of the rod can be increased by simply changing the design of the lens system with almost no decrease in the efficiency of the entire illumination system, so that it is also possible to address the risk that the rod will be broken when, for example, the rod is held.

That is to say, the uniformity also can be improved efficiently and easily by using the relatively short, tapered first rod integrator 11 and the second rod integrator 431 together as in the present embodiment.

In the following, supplemental descriptions of the second rod integrator will be provided. These supplemental descriptions also apply to Embodiment 5 below.

The material of the second rod integrator 431 is not limited to glass. As in the case of the first rod integrator 11, any optically transparent substance having a higher refractive index than the ambient air can be used. Therefore, for example, an acrylic resin or other materials may also be used.

Furthermore, a hollow rod integrator enclosed by four mirrors may also be used. In this case, light incident on side faces of the rod integrator when passing through the inside of the rod integrator is reflected specularly instead of being totally reflected before arriving at the exit end. However, the same effects can be obtained.

Embodiment 5

Figure 6:
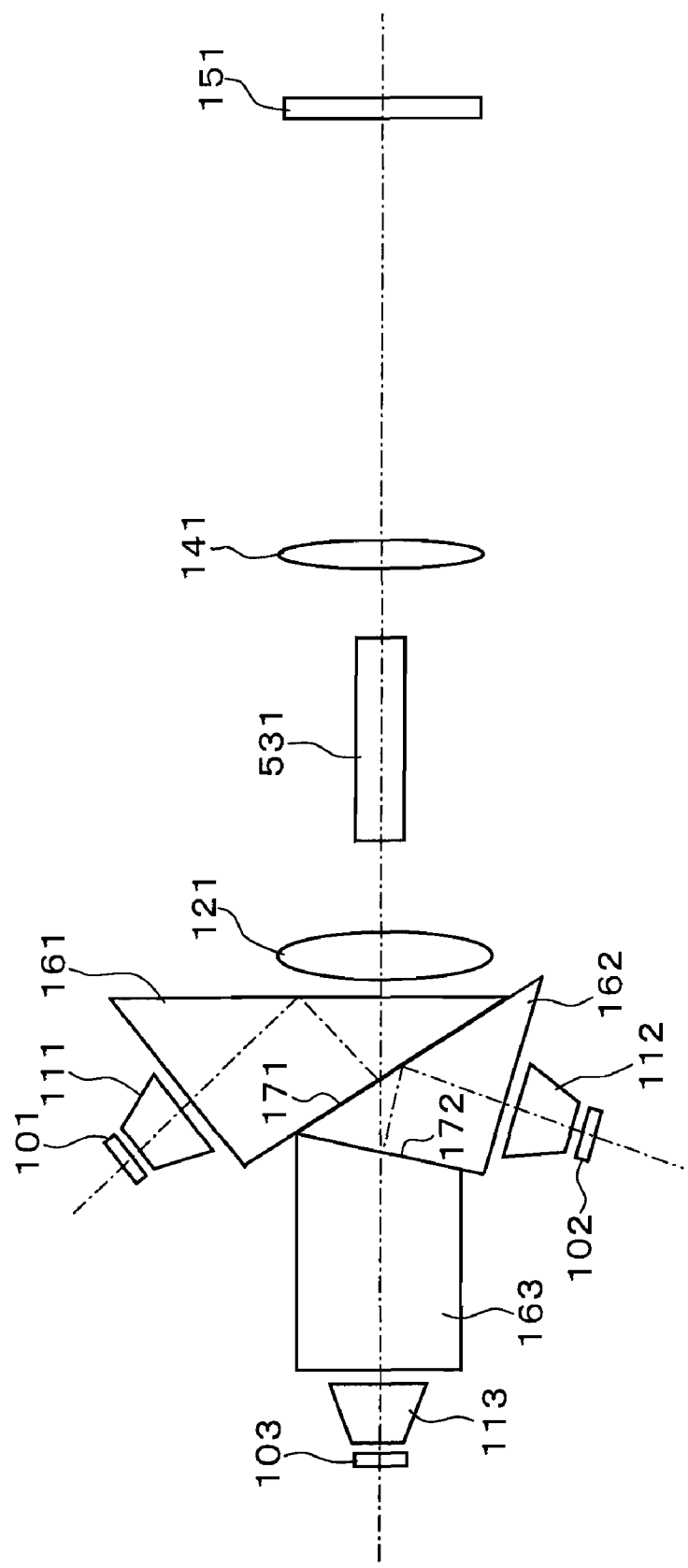
FIG. 6 is a diagram schematically showing a configuration of an illumination apparatus according to Embodiment 5 of the present invention.

FIG. 6 is a diagram schematically showing a configuration of an illumination apparatus according to Embodiment 5. In the configuration of FIG. 6, the lens array 133 of the illumination apparatus shown in FIG. 2 of Embodiment 2 is replaced by a rod integrator 531. Components having the same configuration as those in FIG. 2 are denoted by the same reference numerals, and the description thereof will be omitted.

In the present embodiment, as in the configuration of FIG. 2, the length of the tapered rods 111 to 113 is reduced. Furthermore, as in Embodiment 1, the shapes of the entrance end and the exit end of the tapered rods 111 to 113 are optimized so that light emitted from the light emitting diodes 101 to 103 can be condensed with higher efficiency.

The present embodiment also can provide the same effects as the configuration of FIG. 2. That is to say, since the rod integrator 531 is provided after the three colors are synthesized by the optical thin films such as the three-color synthesizing prism, light with color unevenness that has occurred when the light has passed through the optical thin films 171 and 172 is prevented from being illuminated as it is. As a result, an illumination light beam in which color unevenness is rendered uniform can be transmitted to the surface to be illuminated.

It should be noted that a configuration also may be used in which light from the light sources of three colors is synthesized by using, instead of the three-color synthesizing prism, two or more optical filters synthesizing light of two colors, such as dichroic mirrors as in the configuration of FIG. 3.

Embodiment 6

Figure 7:
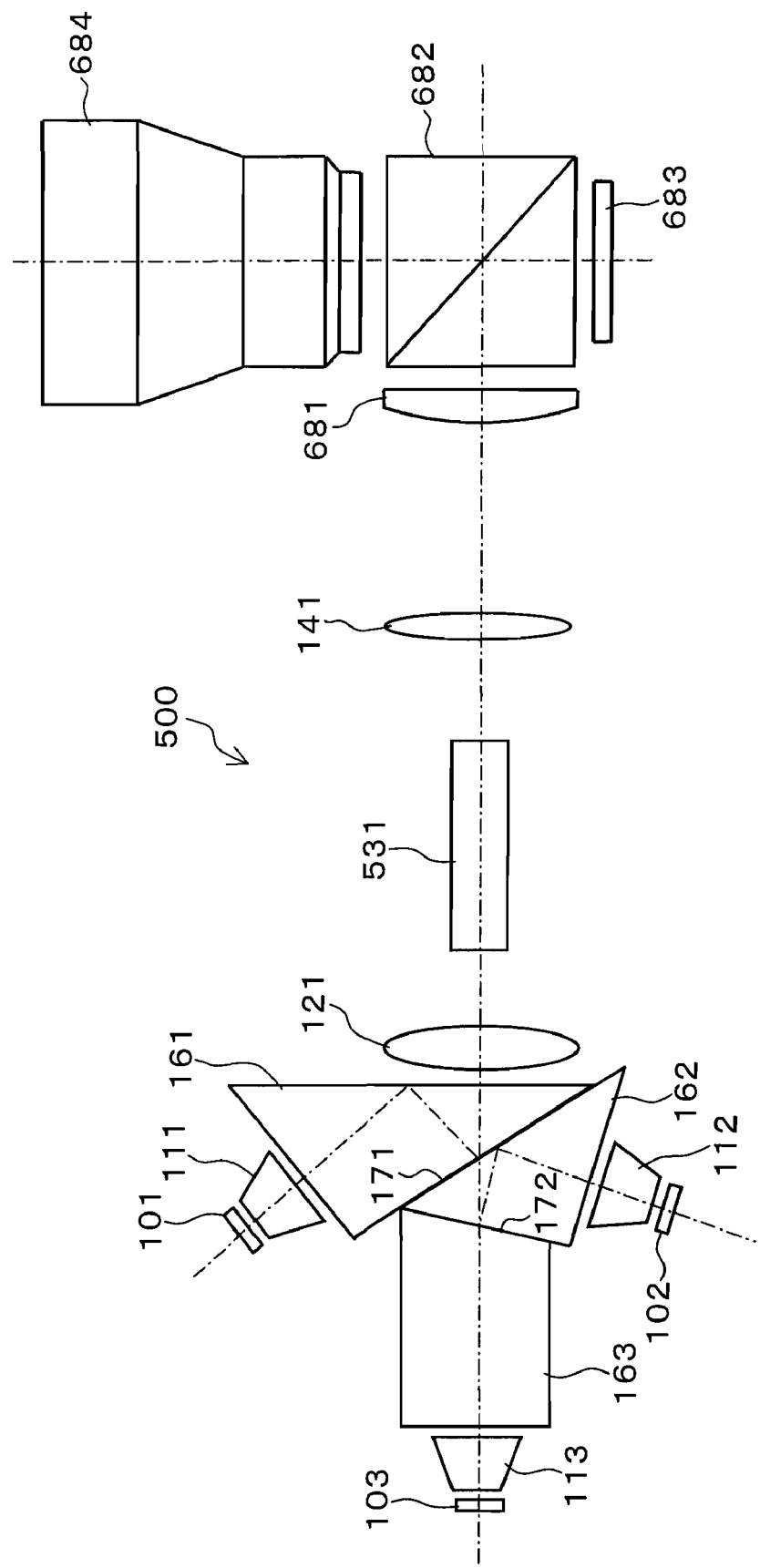
FIG. 7 is a diagram schematically showing a configuration of a projection display apparatus according to Embodiment 6 of the present invention.

FIG. 7 is a diagram schematically showing a configuration of a projection display apparatus according to Embodiment 6. In the configuration of FIG. 7, the illumination apparatus shown in FIG. 6 of Embodiment 6 described above is used as an illumination apparatus 500, and components thereof are denoted by the same reference numerals. Moreover, a field lens 681, a beam splitter 682, an image display element 683, and a projection lens 684 have the same configuration as those in FIG. 4, so that the description thereof will be omitted.

In the projection display apparatus of the present embodiment, the illumination apparatus shown in FIG. 6 of Embodiment 5 is used as the illumination apparatus 500. Therefore, an image that has been illuminated more brightly, and furthermore, more uniformly with little brightness unevenness and color unevenness, can be projected onto a screen.

It should be noted that in the present embodiment, the illumination apparatus shown in FIG. 6 of Embodiment 5 is used as the illumination apparatus 500. However, the illumination apparatus is not limited to the illumination apparatus having this configuration. For example, even when an illumination apparatus having the configuration illustrated by FIG. 5 of Embodiment 4 is used, the same effects can be obtained.

Embodiment 7

Figure 8:
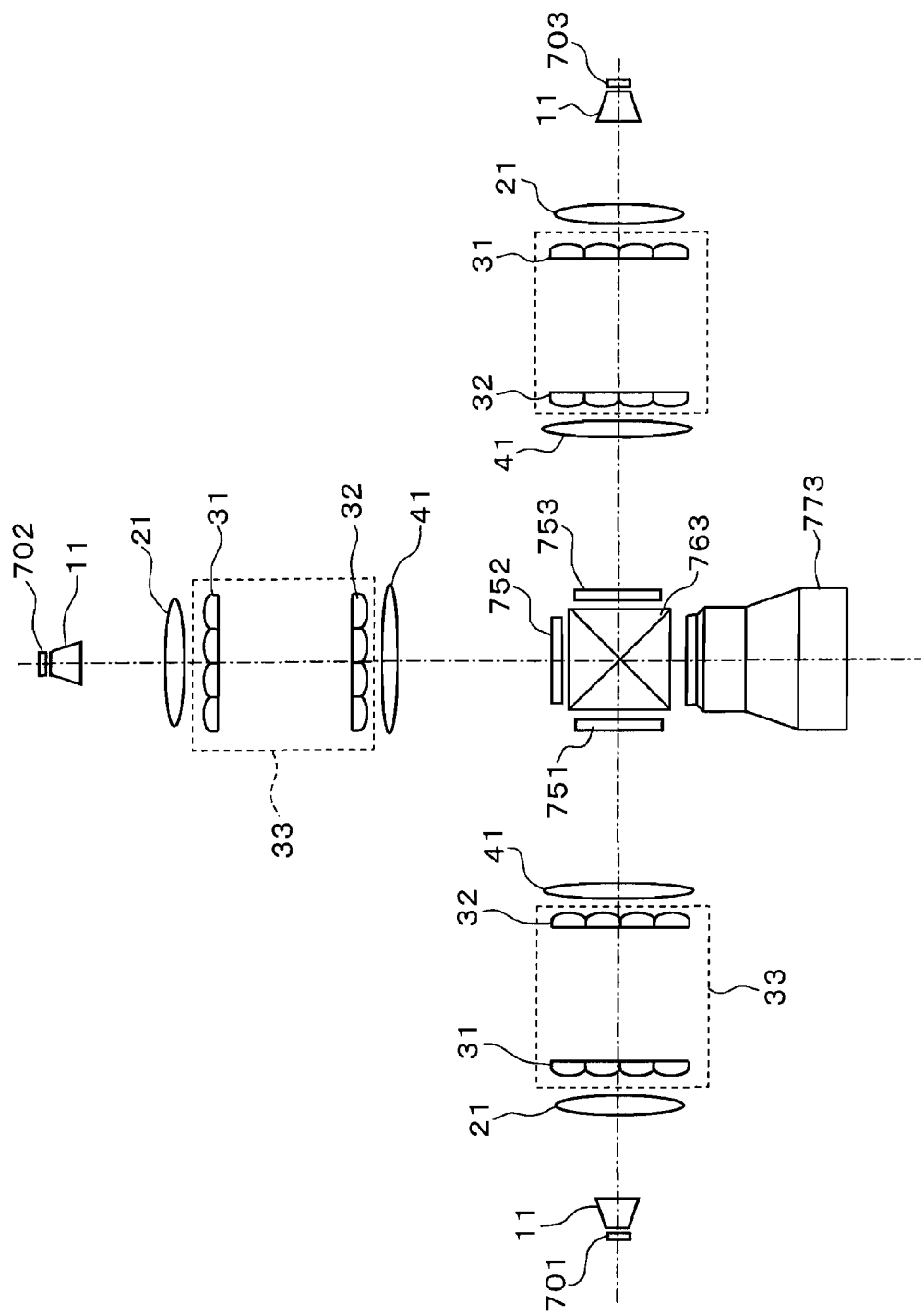
FIG. 8 is a diagram schematically showing a configuration of a projection display apparatus according to Embodiment 7 of the present invention.

FIG. 8 is a diagram schematically showing a configuration of a projection display apparatus according to Embodiment 7. In the configuration of FIG. 8, as illumination apparatuses, the illumination apparatus shown in FIG. 1 of Embodiment 1 is used for each of the light sources of three colors. More specifically, the illumination apparatuses are the illumination apparatus provided with a red light emitting diode 701, the illumination apparatus provided with a blue light emitting diode 702, and the illumination apparatus provided with a green light emitting diode 703. Regarding those illumination apparatuses, components having the same configuration as those in FIG. 1 are denoted by the same reference numerals.

Image display elements 751 to 753 are provided on the surfaces to be illuminated of the respective illumination apparatuses, and a color synthesizing prism 763 for synthesizing light exiting from the three image display elements 751 to 753 and a projection lens 773 are provided.

According to this configuration, the configuration of Embodiment 1 described above is used as the illumination apparatus, so that an image that has been illuminated more brightly, and furthermore, more uniformly with little brightness unevenness, can be projected onto a screen.

Furthermore, even in the cases where unevenness of light emission occurs within the light emitting surface of each of the light emitting diodes 701 to 703 or there are variations in the light intensity distribution with respect to the angle of light radiated from each of the light emitting diodes, all of the light beams of respective colors that illuminate the image display elements 751 to 753 have little in-plane brightness unevenness, and the in-plane color unevenness when a white color is displayed also can be reduced.

Moreover, even in the case where the optical axes of the light emitting diode 701 to 701, the tapered rod integrators 11, and the color synthesizing prism 763 are slightly misaligned, all of the light beams of respective colors that illuminate the image display elements 751 to 753 have little in-plane brightness unevenness. Thus, with an accuracy of adjustment of three image display elements and a color synthesizing prism that is constructed in a three-plate projection display apparatus using three conventional image display elements, the in-plane color unevenness when a white color is displayed also can be reduced.

INDUSTRIAL APPLICABILITY

As described above, according to the present invention, highly uniform illumination can be achieved while condensing light emitted from a light source with higher efficiency. Accordingly, the present invention is useful in, for example, a projector in which images on the surface to be illuminated are required to have little brightness unevenness.

The invention claimed is:

1. An illumination device comprising a light source, a first integrator into which light from the light source enters, and a second integrator into which light exiting from the first integrator enters,
    wherein the light source comprises:
    a first light source emitting light of a first color,
    a second light source emitting light of a second color, and
    a third light source emitting light of a third color; and
    the first integrator comprises:
    a first integrator for the first light source into which light from the first light source enters,
    a first integrator for the second light source into which light from the second light source enters, and
    a first integrator for the third light source into which light from the third light source enters,
    the device further comprising:
    a first optical thin film that synthesizes light of the first color and light in which light of the second color and light of the third color are color-synthesized, and
    a second optical thin film that synthesizes light of the second color and light of the third color,
    wherein light synthesized by the first optical thin film enters the second integrator.

2. The illumination device according to claim 1, wherein a lens means for condensing light exiting from the first integrator is provided between the first integrator and the second integrator.

3. The illumination device according to claim 1, wherein the first integrator is a rod integrator.

4. The illumination device according to claim 3, wherein the rod integrator is a tapered rod integrator with the aperture shape of the exit end being larger than that of the entrance end.

5. The illumination device according to claim 3, wherein the rod integrator is such that the maximum number of times of reflection of an effective light ray of light emitted from the light source that arrives at a region to be illuminated within the first integrator is ten or less.

6. The illumination device according to claim 1, wherein the second integrator is a lens array.

7. The illumination device according to claim 1, wherein the second integrator is a rod integrator.

8. The illumination device according to claim 6, wherein the second integrator is a lens array comprising a first lens array that is disposed on the side of the light source and a second lens array that is disposed on the side of an object to be illuminated, and the shape of the exit aperture of the first integrator and a light source image formed on the second lens array are geometrically similar.

9. The illumination device according to claim 1, wherein the light source is formed from a plurality of light emitting portions.

10. A projection display device provided with the illumination device according to claim 1, the projection display device comprising:
    an image display means for forming an image by modulating illumination light from the illumination device; and
    a projector for projecting light modulated by the image display means onto a screen.

11. The projection display device according to claim 10, wherein the light source comprises:
    a first light source emitting light of a first color,
    a second light source emitting light of a second color, and
    a third light source emitting light of a third color;
    the first integrator comprises:
    a first integrator for the first light source into which light from the first light source enters,
    a first integrator for the second light source into which light from the second light source enters, and
    a first integrator for the third light source into which light from the third light source enters;
    the second integrator comprises:
    a second integrator for the first light source into which light exiting from the first integrator for the first light source enters,
    a second integrator for the second light source into which light exiting from the first integrator for the second light source enters, and
    a second integrator for the third light source into which light exiting from the first integrator for the third light source enters; and
    the image display means comprises:
    an image display means for the first light source that forms an image by modulating illumination light from the second integrator for the first light source, an image display means for the second light source that forms an image by modulating illumination light from the second integrator for the second light source, and an image display means for the third light source that forms an image by modulating illumination light from the second integrator for the third light source, the projection display device further comprising a color synthesizing prism for synthesizing light modulated by the image display means for the first light source, light modulated by the image display means for the second light source, and light modulated by the image display means for the third light source, wherein the projector projects light exiting from the color synthesizing prism onto the screen.

12. The illumination device according to claim 2, wherein the first integrator is a rod integrator.

13. The illumination device according to claim 12, wherein the rod integrator is a tapered rod integrator with the aperture shape of the exit end being larger than that of the entrance end.

14. The illumination device according to claim 12, wherein the rod integrator is such that the maximum number of times of reflection of an effective light ray of light emitted from the light source that arrives at a region to be illuminated within the first integrator is ten or less.

15. The illumination device according to claim 2, wherein the second integrator is a lens array.

16. The illumination device according to claim 15, wherein the second integrator is a lens array comprising a first lens array that is disposed on the side of the light source and a second lens array that is disposed on the side of an object to be illuminated, and the shape of the exit aperture of the first integrator and a light source image formed on the second lens array are geometrically similar.

17. The illumination device according to claim 2, wherein the second integrator is a rod integrator.

18. The illumination device according to claim 2, wherein the light source is formed from a plurality of light emitting portions.

19. A projection display device provided with the illumination device according to claim 2, the projection display device comprising:

an image display means for forming an image by modulating illumination light from the illumination device; and a projector for projecting light modulated by the image display means onto a screen.

20. The projection display device according to claim 19, wherein the light source comprises:

a first light source emitting light of a first color, a second light source emitting light of a second color, and a third light source emitting light of a third color;

the first integrator comprises:

a first integrator for the first light source into which light from the first light source enters, a first integrator for the second light source into which light from the second light source enters, and a first integrator for the third light source into which light from the third light source enters;

the second integrator comprises:

a second integrator for the first light source into which light exiting from the first integrator for the first light source enters, a second integrator for the second light source into which light exiting from the first integrator for the second light source enters, and a second integrator for the third light source into which light exiting from the first integrator for the third light source enters; and the image display means comprises:

an image display means for the first light source that forms an image by modulating illumination light from the second integrator for the first light source, an image display means for the second light source that forms an image by modulating illumination light from the second integrator for the second light source, and an image display means for the third light source that forms an image by modulating illumination light from the second integrator for the third light source, the projection display device further comprising a color synthesizing prism for synthesizing light modulated by the image display means for the first light source, light modulated by the image display means for the second light source, and light modulated by the image display means for the third light source, wherein the projector projects light exiting from the color synthesizing prism onto the screen.

* * * * *